United States Patent
Paillard (10) Patent No.: US 9,138,656 B2
(45) Date of Patent: Sep. 22, 2015

(54) CONTROL OF A PLURALITY OF MOTION PLATFORMS IN SYNCHRONY WITH A SEQUENCE OF IMAGES

(75) Inventor: Bruno Paillard, Sherbrooke (CA)

(73) Assignee: D-BOX TECHNOLOGIES INC., Longueuil (CA)

(*) Notice: Subject to any disclaimer, the term of this patent is extended or adjusted under 35 U.S.C. 154(b) by 1030 days.

(21) Appl. No.: 11/763,031

(22) Filed: Jun. 14, 2007

(65) Prior Publication Data

US 2008/0002390 A1    Jan. 3, 2008

Related U.S. Application Data

(60) Provisional application No. 60/813,345, filed on Jun. 14, 2006.

(51) Int. Cl.
*G06F 9/455* (2006.01)
*A63J 25/00* (2009.01)
*A63G 31/16* (2006.01)
*G05B 15/02* (2006.01)
*G09B 9/02* (2006.01)
*G09B 9/12* (2006.01)

(52) U.S. Cl.
CPC ............... *A63J 25/00* (2013.01); *A63G 31/16* (2013.01); *G05B 15/02* (2013.01); *G09B 9/02* (2013.01); *G09B 9/12* (2013.01)

(58) Field of Classification Search
CPC ......... G06F 11/261; A63J 25/00; G09B 9/12; G09B 9/02; G05B 15/02; A63G 31/16
USPC ......... 703/23, 21; 382/85; 700/3, 7, 9, 23, 60, 700/63, 65; 434/55; 472/60, 130; 297/217.3
See application file for complete search history.

(56) References Cited

U.S. PATENT DOCUMENTS

| | | | | |
|---|---|---|---|---|
| 3,681,531 | A * | 8/1972 | Burkhard et al. | 381/63 |
| 4,879,849 | A * | 11/1989 | Hollingsworth et al. | 52/10 |
| 5,015,933 | A * | 5/1991 | Watkins et al. | 318/567 |
| 5,433,670 | A | 7/1995 | Trumbull | |
| 5,459,382 | A | 10/1995 | Jacobus et al. | |
| 5,524,498 | A * | 6/1996 | Thompson et al. | 73/865.9 |
| 5,568,032 | A | 10/1996 | Wakui | |

(Continued)

FOREIGN PATENT DOCUMENTS

WO    02/052989    7/2002

OTHER PUBLICATIONS

International Search Report Form PCT/ISA/210 pp. 1-3, Sep. 28, 2007.

(Continued)

*Primary Examiner* — Dwin M Craig
(74) *Attorney, Agent, or Firm* — Norton Rose Fulbright Canada LLP (57) ABSTRACT

There is provided a system to provide a sequence of motion samples to a plurality of motion platforms, such as the plurality of seats in a movie theatre, such that the motion is synchronized with a sequence of images, such as a movie. In order to reduce the cost of the system, synchronization of a motion data signal with the sequence of images is centralized at a unique synchronizing unit. The synchronized sequence of motion samples is distributed to a plurality of motion platform hubs, each controlling and managing a reduced number of motion platforms.

13 Claims, 5 Drawing Sheets

(56) References Cited

U.S. PATENT DOCUMENTS

| | | | |
|---|---|---|---|
| 5,597,359 A | 1/1997 | Byerly | |
| 5,857,917 A | 1/1999 | Francis et al. | |
| 6,086,620 A * | 7/2000 | Oliver et al. | 703/13 |
| 6,733,293 B2 * | 5/2004 | Baker et al. | 434/55 |
| 6,870,477 B2 * | 3/2005 | Gruteser et al. | 340/573.1 |
| 2004/0249484 A1 | 12/2004 | Paillard | |
| 2006/0153539 A1 * | 7/2006 | Kaku | 386/112 |

OTHER PUBLICATIONS

European Search Report for corresponding EP application No. 07719980 dated Aug. 4, 2011.

* cited by examiner

CONTROL OF A PLURALITY OF MOTION PLATFORMS IN SYNCHRONY WITH A SEQUENCE OF IMAGES

CROSS-REFERENCE TO RELATED APPLICATIONS

This patent application claims priority of U.S. provisional Patent Application No. 60/813,345, entitled "Method and apparatus for providing a plurality of motions to perform to a plurality of motion platforms" filed on Jun. 14, 2006. The specification of which is hereby incorporated by reference.

TECHNICAL FIELD

This description relates to the field of entertainment motion devices. More precisely, the description pertains to the control of motion platforms such that they are synchronized with a sequence of images.

BACKGROUND OF THE ART

It is desirable to provide users with motion which is synchronized with a video program for entertainment. Such motion enhances the user experience.

One solution to synchronize the motion provided by the motion platform to a video program is based on the audio track of the video program. A motion decoding unit synchronizes a previously recorded motion stream with the video program by recognizing an audio sample and matching it with its associated recorded motion sample. The synchronized motion stream is then provided to a motion platform.

If a small number of motion platforms is to be controlled, a motion decoding unit may control a plurality of motion platforms. Each motion platform needs to be provided with a motion data stream and monitored for fault management and maintenance. When the number of platforms to be controlled increases, the complexity of the motion decoding unit increases accordingly.

Providing a large number of users with motion is often cumbersome and complicated as the operator of such a system is faced with many challenges.

The challenges comprise, but are not limited to, synchronization, distribution of data, etc.

There is a need for a method and system that will overcome at least one of the above-identified drawbacks.

SUMMARY

There is provided a system to provide a sequence of motion samples to a plurality of motion platforms, such as the plurality of seats in a movie theatre, such that the motion is synchronized with a sequence of images, such as a movie. In order to reduce the cost of the system, synchronization of a motion data signal with the sequence of images is centralized at a unique synchronizing unit. The synchronized sequence of motion samples is distributed to a plurality of motion platform hubs, each controlling and managing a reduced number of motion platforms. Platform management is thus decentralized while maintaining a centralized synchronization. Accordingly, the system can rely on a single centralized processing unit comprising, for example, a PC and a high-speed digital signal processing board. The complexity of each motion platform interfaces is reduced and no PC is required in each motion platform interfaces.

According to an example embodiment, there is provided a distribution network hub for providing, to a plurality of motion platforms, a sequence of motion samples synchronized with a sequence of images and indicative of a motion to be performed by the motion platforms, the hub comprising: a motion platform interface to be connected to a plurality of motion platforms, the motion platform interface for actuating the plurality of motion platforms according to the sequence of motion samples by providing, from the sequence and to each motion platform of the plurality, a respective control signal comprising the sequence of motion samples according to a control protocol, each motion platform of the plurality to be managed according to a respective feedback signal to be received from respective ones of the motion platforms according to the control protocol; an input interface for receiving an input control signal according to the control protocol and for extracting the sequence of motion samples from the input control signal; and a motion platform emulator for generating an emulation feedback signal according to the control protocol in response to the input control signal in order to emulate a motion platform.

According to an example embodiment, there is provided a distribution network system comprising a first and a second distribution network hub, the second hub being connected to the motion platform interface of the first hub such that the plurality of motion platforms managed by the first hub comprises the second hub.

According to another example embodiment, there is provided a method for distributing a sequence of motion samples synchronized with a sequence of images to a plurality of motion platforms, the method comprising: receiving an input control signal according to a control protocol; extracting the sequence of motion samples from the input control signal; generating, from the extracted sequence, device control signals comprising the sequence according to the control protocol, the device control signals to be provided to respective motion platforms of the plurality; receiving, from each motion platform of the plurality, a device feedback signal according to the control protocol; and emulating a motion platform by generating an emulation feedback signal according to the control protocol in response to the input control signal.

According to another example embodiment, there is provided a distribution network hub for distributing, to actuation devices, a sequence of actuation samples indicative of an actuation to be performed by the actuation devices, the hub comprising: a device interface to be connected to a plurality of actuation devices, the device interface for actuating the plurality according to the sequence of actuation samples, by providing, from the sequence and to each actuation device of the plurality, a respective device control signal comprising the sequence according to a control protocol, each actuation device of the plurality to be managed according to a device feedback signal to be received from each actuation device of the plurality according to the control protocol; an input interface to receive an input control signal according to the control protocol for extracting the sequence of actuation samples from the input control signal; and an actuation device emulator for generating an emulation feedback signal according to the control protocol in response to the input control signal in order to emulate an actuation device.

BRIEF DESCRIPTION OF THE DRAWINGS

It will be noted that throughout the appended drawings, like features are identified by like reference numerals.

DETAILED DESCRIPTION

Figure 1:
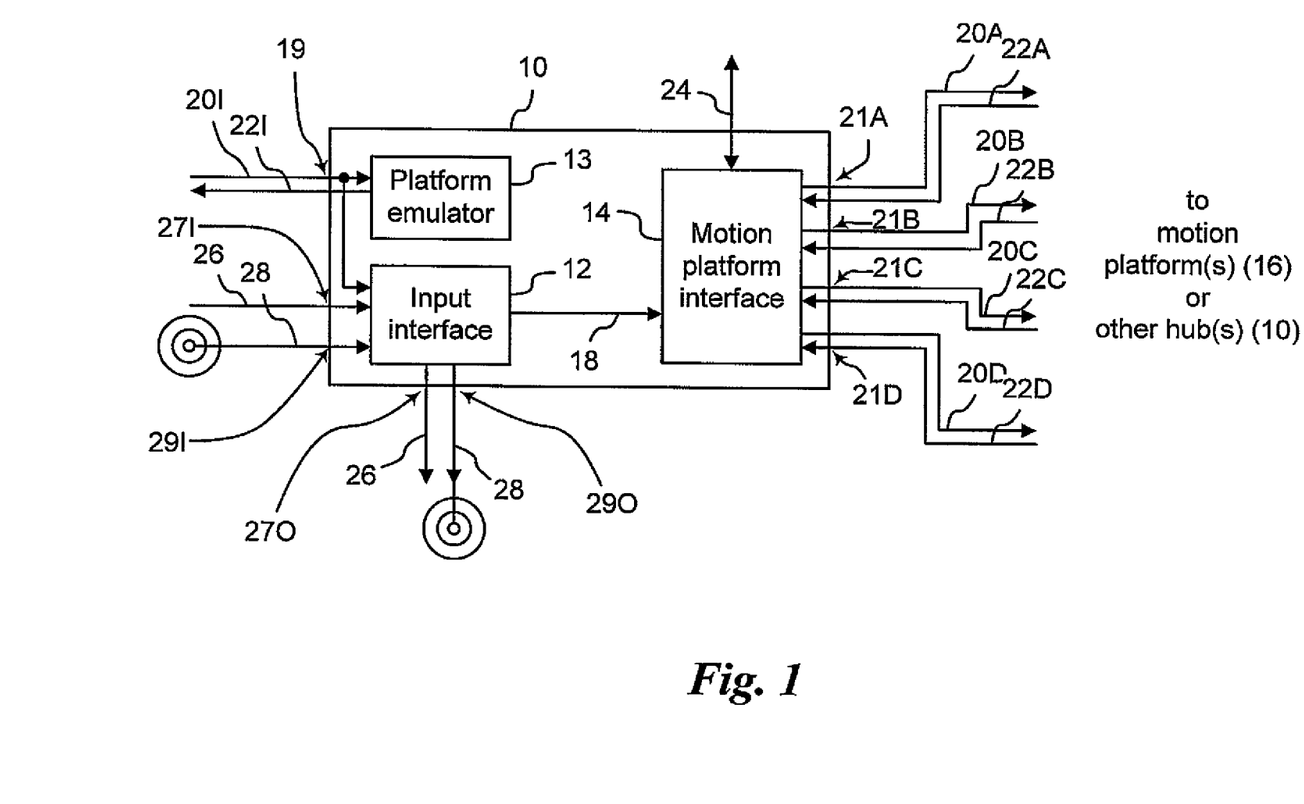
FIG. 1 is a block diagram illustrating a motion platform hub according to an example embodiment described herein.

Now referring to FIG. 1, there is shown a motion platform hub 10 according to an example embodiment described herein. The hub 10 illustrated in FIG. 1 is adapted to distribute a sequence of motion samples, synchronized with a sequence of images, to motion platforms. It is however understood that a similar hub could be used for distributing a sequence of actuation samples to any other type of actuation devices, including but not limited to motion platform devices.

In one embodiment, the motion platforms 16 are provided by D-Box Technology Inc. and each consist of four mechanical actuators, each being positioned on one of the four corners of a seat where a user sits while watching a movie for example. As the movie goes on, the user is provided with motions such as pitch, roll and vibrations, which enhances his/her movie experience. It is noted that the motion platform may also consist of only three mechanical actuators, two in the back corners of the seat and one in the middle front of the seat. Other embodiments with a two-actuator or one-actuator configuration are also useful.

The hub 100 comprises a device interface, in this case a motion platform interface 14, is to be connected to up to four motion platforms 16 using the four downstream control ports 21A, 21B, 21C and 21D. It is noted that, according to the control protocol, each downstream control port 21A, 21B, 21C and 21D is in fact a bidirectional link through which the motion platform interface 14 controls and manages each motion platform 16 and respectively includes an output control signal 20A, 20B, 20C and 20D and an input feedback signal 22A, 22B, 22C and 22D. The control signals 20A, 20B, 20C and 20D synchronously provide the sequence of the motion samples indicative of a motion to be performed to each motion platform 16 along with control data. According to the bidirectional control protocol, each motion platform 16 returns a feedback signal 22A, 22B, 22C and 22D to the motion platform interface 14. The feedback signals 22A, 22B, 22C and 22D provided by the respective motion platforms 16 is used by the motion platform interface 14 for management or maintenance purposes by, for example, monitoring specific operating parameters of the motion platform 16 such as the temperature of the actuators being used, the weights, or fault information data. The motion platform interface 14 completely manages the motion platforms 16 connected to it, including start-up, standby and fault management.

According to the control protocol, the motion platform interface 14 repeatedly seeks for feedback from each motion platform 16. For example, if communication is lost with one actuator of a motion platform 16 or if a failure of one platform 16 is detected during the motion playback, the motion platform interface 14 parks or freezes the motion platform 16 using the control signal 20A, 20B, 20C or 20D, to avoid a situation where the motion platform 16 is not properly supported. Under given circumstances (when failure is due to high temperature of an actuator for example), the motion platform interface 14 may resume the motion control of a platform 16 that has failed after a given period of time.

The motion platform interface 14 also includes a maintenance port 24 for testing and programming in production and installation of the distribution system and for communicating on-site monitoring data from the motion platforms 16 connected to the motion platform interface 14. Such data may include operating parameters of the motion platforms 16 such as temperature of the actuators, weights, or fault information data. The maintenance port 24 may be provided, for instance, in the form of a USB connection. For maintenance purposes, for example, a personal computer (PC) may be momentarily connected to the maintenance port 24 to display diagnostic information about the operation of the hub 10. The PC can be connected dynamically to hub 10 to gather real-time data without interfering with its operation. For example, using the maintenance port 24, the vital signs of the actuators can be monitored, the motion platforms 16 can be muted, the state of the upstream signal can be monitored, radio parameters can be monitored in the case of a wireless connection, or the hub 10 can be reconfigured (transmitter vs. receiver configuration for example, as will be described herein below).

The feedback signal 22 comprises actuator state and actuator vital signs data. This is used to provide diagnostics information to properly manage actuator faults. When the hub 10 directly manages a group of platforms connected to its downstream control port 21A, 21B, 21C and 21D, this diagnostics data is gathered by the motion platform interface 14 and can be accessed by connecting a PC to the maintenance port 24. The diagnostics data of motion platforms connected downstream of the hub 10 is not forwarded back upstream. If access to this data is required, the maintenance port 24 of the specific hub 10 to which the given motion platform is connected should be read. As will be discussed herein below, when another hub (rather than a real motion platform) is connected to a downstream control port 20A, the diagnostics data gathered from the feedback signal 22A is emulated and meaningless.

The hub 10 also receives a control signal 20I according to the control protocol used for controlling motion platforms 16 from another hub upstream or directly from a synchronizing unit, as will be discussed herein below. The upstream control port 19 allows one or more hubs 10 to be connected downstream of another hub using one or more of its downstream control ports 21A, 21B, 21C and 21D.

Accordingly, the hub 10 comprises a platform emulator 13 for generating an emulation feedback signal 22I according to the control protocol in response to the control signal 20I in order to emulate a motion platform. The platform emulator 13 emulates a motion platform by simulating the actuators of the motion platform in a no-hardware-fault behaviour so that the upstream hub or synchronizing unit sends the sequence of motion samples without interruption. However the platform emulator 13 does detect and declare communication faults if and when they occur as this is desirable for a proper management of the control protocol. In case of a communication fault, the upstream synchronizing unit or hub typically resends the message up to three times before declaring a permanent fault and requiring a user intervention. It is understood that the platform emulator 13 never declare faults that are hardware related, such as over-weight faults for instance.

The emulation is desirable to allow the control protocol to move on from the standby state to the active state where motion samples are transmitted. In the normal control of a motion platform, the standby state is the state which is active between feature presentations when no motion needs to be played. In this state, only diagnostics and control commands are transmitted downstream. When the downlink is in this state a motion platform is normally also lowered to its standby mode. When one or more actuators of a motion platform declare a fault, the control protocol also moves to this state. In the active state, motion samples are transmitted downstream. In the normal control of a motion platform, in the active state, the motion platform is active and playing motion.

In the hub 10, whenever motion data are to be sent to downstream motion platforms 16, the upstream synchronizing unit or hub sends motion data according to the active state of the control protocol. When the hub 10 receives an active state control signal 20I, the motion platform interface 14 activates all the downstream ports 21A, 21B, 21C and 21D and sends out the motion data via the control signal 20A, 20B, 20C and 20D.

Similarly, when the sequence of motions is ended, the upstream synchronizing unit or hub sends a control signal 20I according to the standby state of the control protocol. This state is used to minimize the power consumption of the motion platforms and to avoid unnecessary stressing of the system when no motion is to be played. When the hub 10 sees that control signal 20I received from upstream is severed or in the standby state it places all its downstream ports in the standby state accordingly.

The hub 10 also comprises an input interface 12 which receives the control signal 20I according to the control protocol. The input interface 12 extracts the sequence of motion samples included in the received control signal 20I to provide motion samples to the motion platform interface 14 through a motion data signal 18. The motion data signal 18 mostly consists of the synchronized sequence of motion samples to be provided to the motion platforms 16 by the motion platform interface 14.

In the embodiment of FIG. 1, the hub 10 also comprises a wired data input port 27I and a wireless data input port 29I to receive raw or encoded sequence of motion samples and also comprises a wired data output port 27O and a wireless data output port 29O to output the received sequence of motion samples. In one embodiment, the wired data input port 27I is an S/PDIF (IEC-958 type II) input port. This input may be used alternatively to the upstream control port 19 for receiving the sequence of motion samples embedded in a digital audio signal. In this case, the motion samples are extracted from the wired data input signal 26 by the input interface 12 to provide the motion data signal 18. Still, the hub 10 comprises a transceiver (not shown) which may be configured to be used as a wireless data receiver 29I to receive a wireless data signal 28 comprising the sequence of motion samples, or as a transmitter as will be discussed herein below. Only one of the three inputs 19, 27I and 29I should be active at a time. The input interface 12 simply selects the active input port or selects the proper input port based on priority if more then one input port is active. In one embodiment, the highest priority input is the upstream control port 19 and the second highest priority input is the wired data input port 27I, the wireless data receiver 29I being selected only if no wired source is present. The selection is dynamic and can change whenever a new input becomes available or an existing input is turned off. The wireless data receiver 29I only exists on receiver configured hub 10.

In any case, the extracted motion data is always forwarded to the motion platform interface 14 via the motion data signal 18 and is also outputted at the wired data output port 27, as well as transmitted by the wireless data transmitter 29O if the transceiver is configured as a transmitter. This allows the configuration of multiple network topologies as will be shown in reference to FIGS. 2 to 4.

The wireless data signal 28 is unidirectional and includes motion data with added redundancy for increased reliability, as well as an indication of the state of activity of the wireless signal (active or standby).

Figure 2:
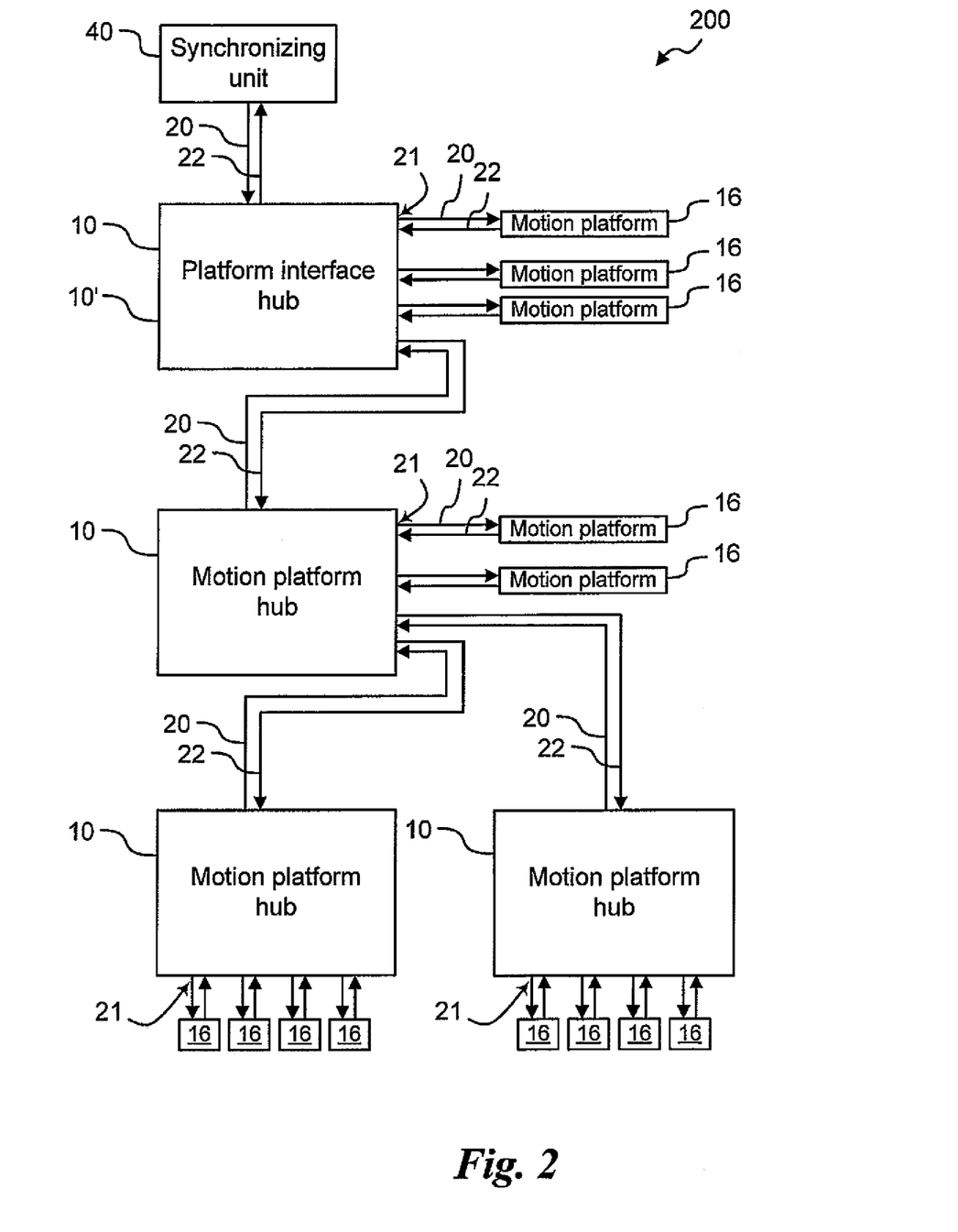
FIG. 2 is a block diagram illustrating a system for distributing motion control signal to a plurality of motion platforms and incorporating the hub of FIG. 1, wherein hubs are connected in a tiered-star configuration using their downstream control ports.

Now referring to FIG. 2, there is shown an embodiment of a system 200 for distributing a sequence of motion samples that is synchronized with a sequence of images to a plurality of motion platforms. The system 200 uses hubs 10 as described in reference to FIG. 1. According to the illustrated embodiment, the system 200 is a distribution network arranged in a tiered-star configuration and comprises a plurality of hubs 10 each receiving a control signal 20 and forwarding the motion samples included in the received control signal 20 to the downstream motion platforms 16 or other hubs 10 using its downstream control port 21. The system 200 comprises a synchronizing unit 40 and hubs 10 for controlling a plurality of motion platforms 16.

The synchronizing unit 40 provides a motion control signal 20 that is synchronized with the sequence of images. For instance, the synchronizing can be done by matching recorded motion samples with the audio track associated with the sequence of images. The audio track is inputted to the synchronizing unit 40 which recognizes an audio sample and synchronously matches it with the corresponding motion sample in a lookup table. The motion samples and its associated audio samples may be provided, for example, as a look-up-table recorded on a DVD or any other storing device. An audio sequence comprising audio samples and synchronized with the sequence of images is provided as the movie is being played. The audio samples of the audio sequence are matched with their associated motion samples to provide a sequence of motion samples. For example, the match may be made using the look-up-table.

The synchronized motion control signal 20 is provided to a first hub 10' and then to all other hubs 10 connected in a tiered-star topology using the downstream control ports 21 of the hubs 10. Each hub 10 extracts the sequence of motion samples from the control signal 20 and synchronously forward the received sequence of motion samples to its downstream control ports 21 to which other hub(s) 10 or motion platform(s) 16 are connected. Each hub 10 generates a separate control signal 20 comprising the sequence of motion samples for each respective motion platform 16 or hub 10 connected to its downstream control ports 21.

The control signals 20 are used to manage the downstream motion platforms 16 or hubs 10 according to respective feedback signals 22 received from each unit 16 or 10 according to the control protocol. As each hub 10 emulates a motion platform 16 and thus provides a feedback signal 22 to its upstream hub 10, the upstream hub 10 sees the downstream hub 10 as if it was a motion platform 16 and provides it with a control signal 20 accordingly.

The management of a given motion platform 16 is handled by a corresponding motion platform hub 10 to which a sub-group of motion platforms 16 including the given platform is connected. The management of the motion platforms 16 being decentralized, the operation of the plurality of motion platforms 16 is independent of the operation of the motion platforms 16 connected to another hub 10, which is advantageous for maintaining the synchronization, especially in the case of a malfunction of a given motion platform 16. The synchronization aspect is centrally handled by the synchronizing unit 40 and the synchronous providing of the control signal 20 to the motion platforms 16 is provided by the hubs 10.

Figure 3:
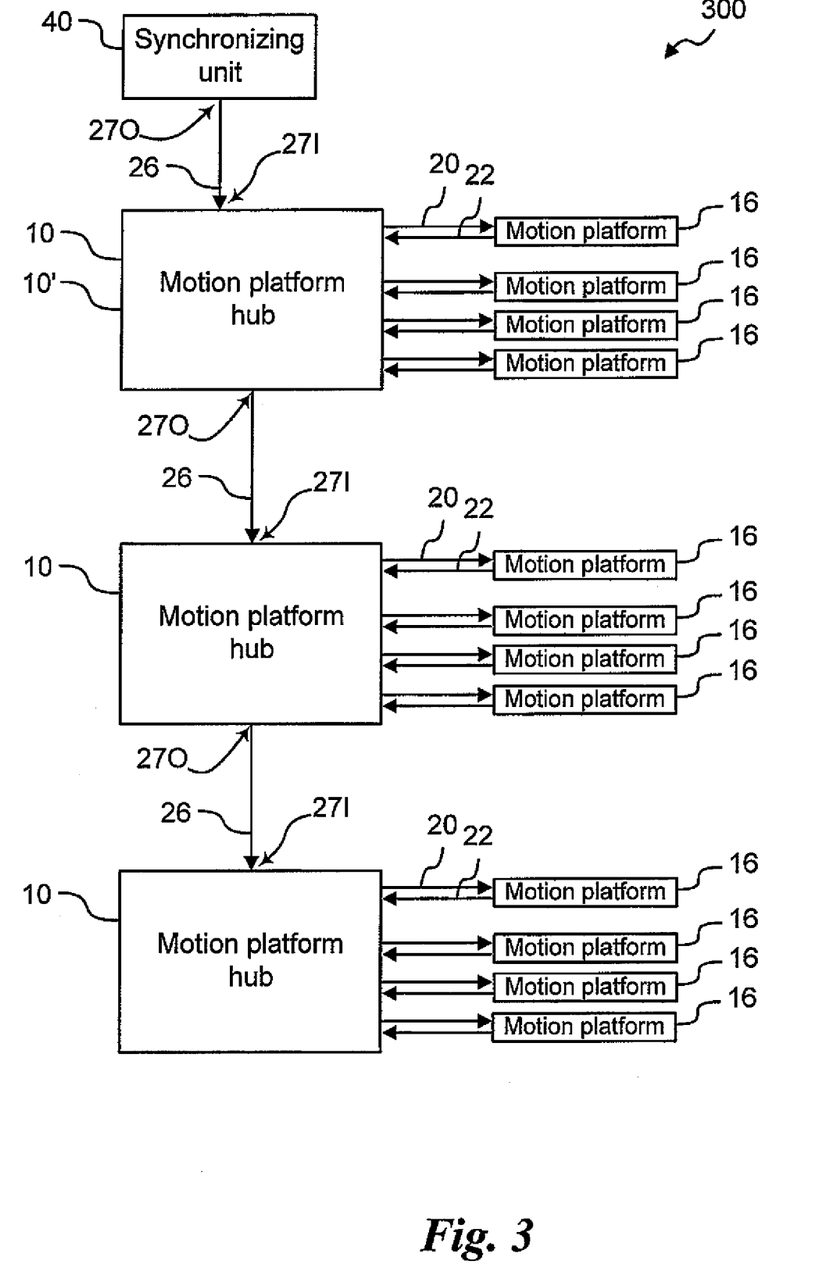
FIG. 3 is a block diagram illustrating a system for distributing motion control signal to a plurality of motion platforms and incorporating the hub of FIG. 1, wherein hubs are cascaded in a daisy-chain configuration using their wired data signal outputs.

Now referring to FIG. 3, there is shown another embodiment of a system 300 for providing motion control signals 20 that are synchronized with a sequence of images to a plurality of motion platforms 16. The system 300 also uses hubs 10 as described in reference to FIG. 1 but its distribution network is arranged in a substantially daisy-chain configuration using the wired data output ports 27O. System 300 and system 200 comprising similar devices, like reference numerals are used to refer to like devices having like functionalities. Accordingly, the like devices will not be repeatedly described.

The system 300 comprises a synchronizing unit 40 and cascaded motion platform interface hubs 10, each for controlling and managing a sub-group of motion platforms 16. A first hub 10' is connected to the synchronizing unit 40 via its wired data input port 27I. The first hub 10' thus receives the sequence of motion samples and forwards it to the next cascaded hub 10 via its wired data output port 27O. Each subsequent cascaded hub 10 receives a wired data signal 26 at its wired data input port 27I and forwards it to the next hub 10 using its wired data output port 27O. As such, all the downstream control ports 21 of every cascaded hub 10 are available for controlling and managing motion platforms 16.

In the case where the system 300 is used in a movie theatre, the hubs 10 may be located in a single control room or may be distributed in the auditorium. For example, each seat may be motion controlled using one motion platform 16 comprising four actuators (one on each leg of the seat) and each hub 10 may manage one row or one column of seats. In this case, each hub 10 has at least as much downstream control ports 21 as the number of seats per row in the theatre. Alternatively, seats may be grouped such that each motion platform 16 activates a group of two or more joined seats.

Figure 4:
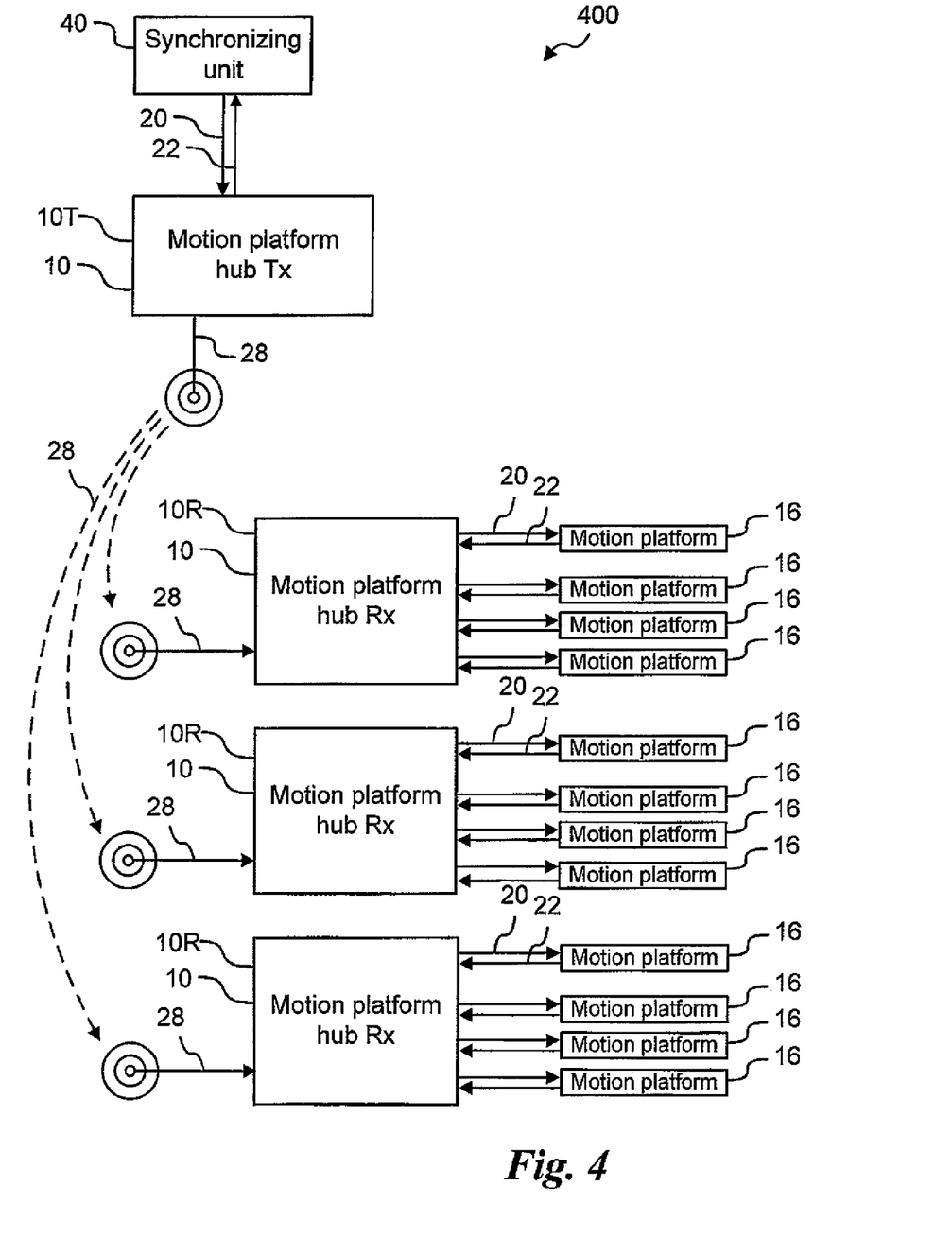
FIG. 4 is a block diagram illustrating a system for distributing motion control signal to a plurality of motion platforms and incorporating the hub of FIG. 1, wherein hubs are wirelessly connected.

Now referring to FIG. 4, there is shown still another embodiment of a system 400 for providing motion control signals that are synchronized with a sequence of images to a plurality of motion platforms. The system 400 also uses hubs 10 as described in reference to FIG. 1 but uses wireless communication to distribute the sequence of motion samples to a plurality of motion platforms 16. Each hub 10 is thus configured either as a transmitter hub 10T or a receiver hub 10R. Systems 400, 300 and 200 comprising similar devices, like reference numerals are used to refer to like devices having like functionalities. Accordingly, the like devices will not be repeatedly described.

The system 400 comprises a synchronizing unit 40 and networked motion platform interface hubs 10, each for controlling and managing a sub-group of motion platforms 16. A first hub 10T is configured to be used as a transmitter and, in the illustrated embodiment, it is connected to the synchronizing unit 40 via the downstream control port 21 of the synchronizing unit 40. The transmitter hub 10T thus receives the sequence of motion samples and wirelessly broadcasts it to a plurality of receiver hubs 10R using the wireless data receivers 29I and transmitter 29O. Similarly to the system 300, all the downstream control ports 21 of every receiver hub 10R are available for controlling and managing motion platforms 16.

More precisely, even if in the embodiments illustrated in FIGS. 2 to 4 the synchronizing unit 40 provides the sequence of motion samples to only one hub 10' (which forwards the sequence to other hubs 10) the synchronizing unit 40 is adapted to provide a control signal 20 to a plurality of hubs 10 or motion platforms 16.

It will be appreciated that using the system 200, 300 or 400 it is possible to control a plurality of motion platforms 16 using a single synchronizing unit 40. An exemplary setting for the presently described embodiments is a movie theatre in which a plurality of motion platforms are required, each motion platform handling a given array of seats.

In the systems 200 and 400, the motion platforms 16 are only active when the control signal 20 provided by the synchronizing unit 40 is in the active state. When the control signal 20 generated by the synchronizing unit 40 is in the standby state, the standby state is forwarded to the motion platforms 16 and the motion platforms 16 are consequently lowered to their standby mode. In the case of the system 300, the downstream control ports 21 are only in the active state when a sequence of motion samples is actually generated by the synchronizing unit 40 and received at the wired data signal input port 27I. When no data is being received, the downstream control ports 21 are placed in the standby state and the motion platforms 16 are consequently lowered to their standby mode.

If a fault occurs on one of the motion platforms 16, the corresponding hub 10 attempts to restart the faulty motion platform up to three consecutive times. After three attempts the hub 10 will stay in the standby state for the faulty motion platform but will maintain the active state for the motion platforms 16 connected to its other downstream control ports 21. The hub 10 should then be restarted to initiate three more attempts, or a PC should be connected to the maintenance port 24 to retrieve the diagnostics information and manually restart the faulty motion platform 16 when the cause of the fault has be handled.

It will be appreciated that due to transmission delays, each of the hubs 10 may be calibrated to delay a motion playback by an adjustable amount of time. The skilled addressee will appreciate that it takes approximately 3 ms for sound to travel 1 m or air space. Therefore, distances of 10 m or more, which are typical distances between a speaker and a listener, introduce delays of about 30 ms. While this is not critical when considering only audio and video as a listener can tolerate a large amount of de-synchronization between audio and video, the synchronization must be more accurate between audio and motion. Each hub 10 therefore includes a delay generator to introduce a motion delay depending on a physical position of an element with respect to a main speaker. A given motion delay is programmed in each motion platform interface 14 using the maintenance port 24. Every hub 10 in the chain can be adjusted for a specific pass-through delay but if the signal received by a motion platform 16 passes through several hubs 10 on its way, the total delay is the sum of the delays encountered at hub in the chain. Accordingly, to facilitate the management of pass-through delays it is possible to adjust the delays of mid-level hubs 10 to a minimum delay and only introduce a motion delay at the end-level hubs 10 directly connected to motion platforms 16. Also in order to minimize the total delay, it is best to limit the number of hubs 10 that the signal must go through to a minimum.

The skilled addressee will appreciate that while the embodiments disclosed in FIGS. 2 to 4 show a given number of hubs 10 and motion platforms 16, an arbitrary number of motion platforms 16 may be controlled using different configurations of hubs 10. It should also be understood that, a given hub 12 may be connected to one or more motion platform 16 and/or to one or more hubs 10.

The skilled addressee will appreciate that while in one embodiment all hubs 10 are powered using a single power source, each hub 10 may also be powered using a separate power source.

Figure 5:
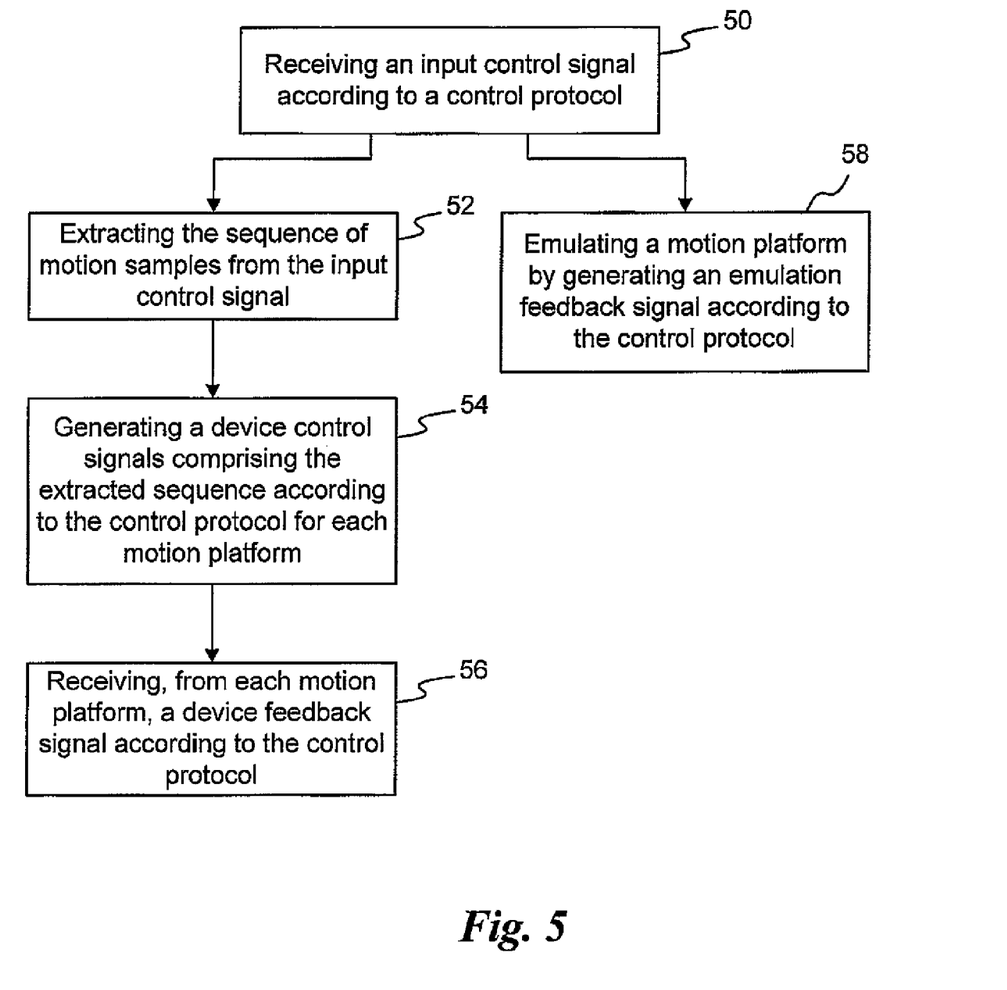
FIG. 5 is a flow chart illustrating a method for providing a control signal synchronized with a sequence of images to a plurality of motion platforms.

Now referring to FIG. 5 and to FIGS. 1 and 2, there is provided an example method for distributing a sequence of motion samples synchronized with a sequence of images to a plurality of motion platforms 16.

According to step 50, a control signal 20 comprising motion samples synchronized with a sequence of images is received. In one embodiment, the control signal 20 is received from the upstream device through the upstream control port 19. In one embodiment, the control signal 20 is provided by the synchronizing unit 40 to one first hub 10'. It will be understood that the control signal 20 is synchronized with the sequence of images. In one embodiment, the sequence of images is a movie.

In one embodiment, the sequence of motion samples comprises a stream of motion samples having a sampling rate and the control signal 20 is formatted such that the stream of motion samples is synchronously provided with the sampling rate.

According to step 52, the motion samples are extracted from the received control signal 20. Accordingly, the motions samples are split apart from the control data included in the control signal 20 according to the control protocol.

According to step 54, a control signal 20 comprising the extracted synchronized motion samples is generated according to the control protocol, for each motion platform connected. In one embodiment, the control signals 20 are generated by the motion platform interface 14 which provides a control signal 20 to each motion platform connected to the hub 10'. It is noted that each motion platform connected to the hub 10' can be a real motion platform device 16 or another hub 10 emulating a motion platform 16.

According to step 56, a feedback signal 22 is received according to the control protocol from each motion platform connected. The feedback signals 22 are used in managing the respective motion platform 16. Each motion platform 16 is managed independently.

According to step 58, a motion platform is emulated by generating an emulation feedback signal 22 according to the control protocol. In one embodiment, the motion platform is emulated by the platform emulator 13 and the feedback signal 22 is provided to the upstream hub 10 or synchronizing unit 40 thought the upstream control port 19.

For illustration purposes, the number of downstream control ports 21 of the hub 10 of FIGS. 1 to 4 is limited to four, but it is noted that this number may be higher. For example, in another embodiment, the number of control signal outputs is twelve.

It is noted that the motion platform interface 14, the platform emulator 13 and the input unit 12 could be provided as separate units or combined into two sub-units exchanging data.

The skilled addressee will appreciate that the embodiment disclosed enables the provision of an actuation data signal to a plurality of actuation devices. In the illustrated embodiments, the actuation devices consist of motion platforms but it is noted that a hub such as the ones described herein could also be used to control an other actuation device.

The skilled addressee will appreciate that motion platform refers herein to any vibrokinetic platform including a motion platform for providing only vibrations to the user, the provided vibrations being typically related to the sound track of a movie and thus being indirectly synchronized with a sequence of images.

While illustrated in the block diagrams as groups of discrete components communicating with each other via distinct data signal connections, it will be understood by those skilled in the art that the illustrated embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

It should be noted that the present invention can be carried out as a method, can be embodied in a system, a computer readable medium or an electrical or electro-magnetical signal.

The embodiments described above are intended to be exemplary only. The scope of the invention is therefore intended to be limited solely by the scope of the appended claims.

I claim:

1. A method for distributing motion from at least one centralized distribution network hub, signals synchronized with an audio track to a plurality of motion platforms each supporting a seat, said method comprising:
   receiving an input control signal comprising motion signals constituted of motion samples indicative of a motion to be performed by said motion platforms;
   synchronizing the motion signals with an audio track by recognizing audio samples from the audio track, looking up a look-up table in which the audio samples are matched to motion samples, and matching motion samples to the audio samples;
   generating, from the motion signals, control signals for each of the plurality of motions platforms, the control signals comprising the motion signals and being generated according to a control protocol;
   sending the device control signals to each said seat via the respective motion platforms; and
   receiving, from each motion platform of said plurality, a device feedback signal according to said control protocol, the device feedback signal containing information unique to each said motion platform.

2. The method as claimed in claim 1, further comprising generating a separate and individual time delay in said device control signals according to a position of said motion platforms of said plurality relative to sound speakers.

3. The method as claimed in claim 1, further comprising managing each motion platform of said plurality according to the respective device feedback signal.

4. The method as claimed in claim 1, wherein individually sending the device control signals to each said seat comprises causing an actuation of electrically-powered mechanical actuators positioned at legs of each said seat.

5. The method as claimed in claim 1, wherein individually sending the device control signals to each said seat comprises sending standby state signals to at least one said motion platform.

6. The method as claimed in claim 5, wherein sending standby state signals to at least one said motion platform comprises causing the at least one said motion platform to minimize power consumption by being lowered.

7. The method as claimed in claim 1, wherein receiving the input control signal according to the control protocol comprises wirelessly receiving the input control signal according to the control protocol.

8. The method as claimed in claim 1, wherein receiving the input control signal according to the control protocol comprises receiving at least two of the input control signal and prioritizing one of the input control signal over another of the input control signal.

9. The method as claimed in claim 1, wherein receiving the device feedback signal comprises receiving a failure signal from one said motion platform, and further comprising automatically resuming a motion control of the one said motion platform by sending device control signals to the one said motion platform after a given period of time.

10. A system of a distribution network hub and network of motion platforms for providing, to a plurality of the motion platforms, motion signals constituted of motion samples indicative of a motion to be performed by said motion platforms in synchronization with an audio track, said system comprising:
- a distribution network hub comprising:
  - an input interface for receiving an input control signal including said motion signals;
  - a motion platform interface to be connected to each motion platform of said plurality, said motion platform interface for actuating said plurality of motion platforms according to said motion signals by providing, specifically to each motion platform of said plurality, an individual control signal comprising said motion signals according to a control protocol;
- a synchronizing unit for synchronizing the motion signals with an audio track by recognizing audio samples from the audio track and matching motion samples to the audio samples;
- a delay generator for generating a given time delay in said respective control signal according to a position of said motion platforms relative to sound speakers; said motion platforms, with each said motion platform individually connected to a seat, each said motion platform receiving the respective control signal for converting the respective control signal into mechanical movement for said individual seat as synchronized with the audio track, each motion platform of said plurality to be managed according to a respective feedback signal to be received from respective ones of said motion platforms according to said control protocol, the respective feedback signal containing information unique to each said motion platform; and
- a wired connection from motion platform interface of the distribution network hub to each said seat via each said motion platform.

11. The system as claimed in claim 10, wherein said motion signals comprise a sequence of motion samples with a stream of said motion samples having a sampling rate and wherein said input control signal is formatted such that said stream of motion samples is synchronously provided with said sampling rate.

12. The System of claim 10, comprising at least a second one of said distribution network hub, the second network distribution hub being connected to the motion platform interface of the first network distribution hub such that the plurality of motion platforms managed by the first network distribution hub comprises the second network distribution hub.

13. The system as claimed in claim 10, wherein said motion platforms comprises electrically-powered mechanical actuators positioned at legs of each said seat, with the mechanical movement of each said seat being performed by the electrically-powered mechanical actuators.

* * * * *